(12) United States Patent
Thiec

(10) Patent No.: US 12,539,712 B2
(45) Date of Patent: Feb. 3, 2026

(54) METHOD FOR MANUFACTURING A VISUAL DISPLAY ASSEMBLY AND VISUAL DISPLAY ASSEMBLY

(71) Applicant: Société BIC, Clichy (FR)

(72) Inventor: Frédéric Thiec, Ploemeur (FR)

(73) Assignee: Société BIC, Clichy (FR)

( * ) Notice: Subject to any disclaimer, the term of this patent is extended or adjusted under 35 U.S.C. 154(b) by 0 days.

(21) Appl. No.: 17/905,213

(22) PCT Filed: Mar. 9, 2021

(86) PCT No.: PCT/EP2021/055945
§ 371 (c)(1),
(2) Date: Aug. 29, 2022

(87) PCT Pub. No.: WO2021/180737
PCT Pub. Date: Sep. 16, 2021

(65) Prior Publication Data
US 2023/0123447 A1   Apr. 20, 2023

(30) Foreign Application Priority Data

Mar. 9, 2020   (FR) ..................................... 2002313

(51) Int. Cl.
*B41M 1/12*   (2006.01)
*B41M 3/00*   (2006.01)
(Continued)

(52) U.S. Cl.
CPC .............. *B41M 1/12* (2013.01); *B41M 3/003* (2013.01); *B42D 25/405* (2014.10); *G02B 3/005* (2013.01)

(58) Field of Classification Search
None
See application file for complete search history.

(56) References Cited

U.S. PATENT DOCUMENTS 6,422,859 B1    7/2002  Demetz
2007/0273143 A1* 11/2007  Crane .................. G02B 3/0006
                                                    283/72

(Continued)

FOREIGN PATENT DOCUMENTS

DE       102009035119 A1 *  2/2011  ............... G02B 5/18
JP          2008052202 A  *  3/2008
(Continued)

OTHER PUBLICATIONS

English translation of JP 3169584 U to Doi, publication date Aug. 4, 2011. (Year: 2011).*

(Continued)

*Primary Examiner* — Leslie J Evanisko
(74) *Attorney, Agent, or Firm* — Bookoff McAndrews, PLLC

(57) ABSTRACT

A method for manufacturing a visual display assembly, comprising: providing a film of transparent material comprising a first surface and a second surface opposite the first surface, the first surface comprising an array of lenses comprising information that is arranged so as to be capable of providing multiple images when the images are viewed from different predetermined angles through the lenses; placing a screen-printing fabric in proximity to the first surface in order to form a pattern or printed image; applying a layer of ink or varnish to the screen-printing fabric allowing the ink or varnish to pass through for placement on a portion of the first surface; wiping the ink or varnish by means of a squeegee over the screen-printing fabric.

21 Claims, 6 Drawing Sheets

(51) Int. Cl.
*B42D 25/405* (2014.01)
*G02B 3/00* (2006.01)

(56) References Cited

U.S. PATENT DOCUMENTS

| | | | | |
|---|---|---|---|---|
| 2012/0140333 A1* | 6/2012 | Tomczyk | ........... | G02B 27/0961 359/619 |
| 2013/0063825 A1* | 3/2013 | Spiro | ........... | G02B 3/005 359/619 |
| 2013/0077174 A1* | 3/2013 | Spiro | ........... | G02B 3/005 359/619 |
| 2013/0094789 A1* | 4/2013 | Hoffman | ........... | G02B 3/005 383/106 |
| 2013/0139711 A1* | 6/2013 | Clarke | ........... | B41F 15/44 101/123 |
| 2014/0175786 A1* | 6/2014 | Doublet | ........... | B42D 25/00 283/67 |
| 2017/0313121 A1* | 11/2017 | Schilling | ........... | B42D 25/47 |

FOREIGN PATENT DOCUMENTS

| | | | |
|---|---|---|---|
| JP | 2008129038 A | * | 6/2008 |
| JP | 3169584 U | * | 8/2011 |
| WO | 2013/030782 A1 | | 3/2013 |

OTHER PUBLICATIONS

English translation of DE 10 2009 035 119 A1 to Maleck et al., publication date Feb. 3, 2011. (Year: 2011).*
English translation of JP 2008-052202 A to Omori, publication date Mar. 6, 2008. (Year: 2008).*
International Search Report and Written Opinion in International Application No. PCT/EP2021/055945, mailed May 19, 2021 (9 pages).
Helmut Kipphan: "Handbook of Print Media", 2000, Springer, Berlin Heidelberg New York, XP002800571, ISBN: 3-540-66941-8, pp. 56-59. Concise statement of relevance provided in lieu or a translation.

* cited by examiner

METHOD FOR MANUFACTURING A VISUAL DISPLAY ASSEMBLY AND VISUAL DISPLAY ASSEMBLY

CROSS REFERENCE TO RELATED APPLICATION

This application is a National Stage Application of International Application No. PCT/EP2021/055945, filed on 9 Mar. 2021, now published as WO2021180737 and which claims priority from French Application FR2002313, filed on 9 Mar. 2020.

TECHNICAL FIELD

The present disclosure relates to a method for manufacturing a visual display assembly. It finds application particularly in a visual display assembly that can be used as an anti-counterfeiting device or—unique among its kind—for labels on products and/or lighters.

PRIOR ART

Today, many products or lighters are subject to counterfeiting.

The lighter is known and conventionally comprises a lighter body that is equipped with a reservoir and an igniter. The reservoir is a fuel tank. The igniter can be of different types, particularly a piezoelectric-type igniter, a friction igniter, or simply electric. A friction igniter has a thumbwheel that causes friction upon contact with a spark stone. In the latter case, the igniting of a lighter involves the manipulation of the wheel, generally with the thumb. Upon completing the manipulation of the thumbwheel, the thumb then presses, almost simultaneously, on a push-button of a valve that releases fuel. The release of fuel occurs at the very moment the spark occurs, thus producing the flame.

In the context of piezoelectric ignitions, the push-button is actuated by a user's finger, generally the thumb. When the thumb is pressed on this pusher, a first displacement of this pusher compresses a spring. Continuation of this support suddenly releases the spring. This then strikes a piezoelectric quartz, which also produces a spark. The production of the spark is also simultaneous with the release of the fuel as a result of the consecutive action on the push-button, that opens the fuel valve.

Lighters are widely used and often employed as promotional items.

The type of film used for decoration (sleeve or label) is either glossy or matt. The drawback of this type of film is that it is not scratch-resistant and can be torn off easily. In addition, the film used for decoration is easy to reproduce, and there are counterfeit lighters whose existence is related to the reproduction of the film for decoration.

It is one of the objects of the disclosure to have a film that is used for decoration but is unique among its kind.

PRESENTATION OF THE DISCLOSURE

The present disclosure aims to remedy these drawbacks with a completely innovative approach.

To this end, according to a first aspect, the present disclosure relates to a method for manufacturing a visual display assembly, the method being characterized in that it comprises:

providing a film of transparent material comprising a first surface and a second surface opposed to the first surface, the first surface comprising an array of lenses comprising information that is arranged so as to be capable of providing multiple images when the images are viewed from different predetermined angles through the lenses;

placing a screen-printing fabric in proximity to the first surface in order to form a pattern or a printed image;

applying a layer of ink or varnish to the screen-printing fabric and allowing the ink or varnish to pass through for placement on a portion of the first surface;

wiping the ink or varnish by means of a squeegee over the screen-printing fabric.

By virtue of these arrangements, it is possible to print an image on the curved portion of the lenticular film.

The disclosure also relates to a method for manufacturing a visual display assembly to be applied to a lighter.

Other advantages in general or related to the product is a use as an anti-counterfeiting device. More specifically, the assembly is useful as an anti-counterfeiting device on product labels.

The ink or varnish makes it possible to mask the 3D effect in one place in order to visually isolate it, detaching it from the decoration by placing it in the foreground.

The pattern is a square, for example.

The disclosure is advantageously implemented according to the embodiments and the variants set out below, which are to be considered individually or in any technically operative combination.

In one embodiment, the method further comprises a step of applying an adhesive layer to the second surface of the transparent material. The layer is configured such that it cannot be peeled off.

By virtue of these arrangements, it is possible to peel off and re-glue the film on the product, such as a lighter, making it possible to avoid manufacturing rejections.

In one embodiment, the method further comprises providing a flexible support on which a pattern, image, or text is printed, the flexible support being positioned beneath the second surface of the transparent material film.

In one embodiment, the method further comprises a step of applying an adhesive layer beneath the flexible support, the adhesive layer being configured such that it can be peeled off and then re-glued at least once without leaving a trace of the adhesive layer.

The layer is configured so as not to leave traces of adhesive on the product during its detachment.

The adhesive layer beneath the flexible support is provided in order to hold the assembly on a product or a silicone support.

In one embodiment, the screen-printing fabric has at least 70 threads/cm.

In one embodiment, the thickness of the layer of ink or varnish is between 40 microns and 70 microns.

In one embodiment, the screen-printing fabric is colored.

In this way, it makes it possible to block the diffusion phenomena and to have the best possible definition during the exposure of the artwork.

According to a second aspect, the present disclosure relates to a visual display assembly which is characterized in that it comprises:

a film of transparent material comprising a first surface and a second surface opposite the first surface, the first surface comprising an array of lenses comprising information that is arranged so as to be capable of providing multiple images when the images are viewed from different predetermined angles through the lenses;

a printed image partially covering the first surface.

Given that the advantages, aims, and particular characteristics of this assembly are similar to those of the method which is the subject of the present disclosure, they will not be repeated here.

According to a third aspect, the present disclosure relates to a lighter comprising:
- a lighter body comprising a fuel tank with a valve for releasing the fuel;
- an assembly in a piezoelectric, electrical, or friction wheel system that can be used and/or turned by a user in order to produce sparks directed toward the fuel released from the valve, the piezoelectric, electrical, or friction wheel assembly being mounted on the lighter body such that at least a portion thereof is exposed for manipulation and/or rotation by the user;
- a valve actuator that can be lowered for the purpose of actuating the valve and releasing the fuel;

the lighter being characterized in that it further comprises:
- a visual display assembly that is glued to the lighter body, the visual display assembly comprising:
  - a film of transparent material comprising a first surface and a second surface opposite the first surface, the first surface comprising an array of lenses comprising information that is arranged so as to be capable of providing multiple images when the images are viewed from different predetermined angles through the lenses;
  - an image or pattern that is printed with ink or varnish and partially covers the first surface.

More specifically the assembly in a piezoelectric, electrical, or friction wheel system that can be turned by a user in order to produce sparks directed toward the fuel released from the valve, the piezoelectric, electrical, or friction wheel assembly being mounted on the lighter body such that at least a portion thereof is exposed for manipulation and rotation by the user.

Given that the advantages, aims, and particular characteristics of this lighter are similar to those of the method which is the subject of the present disclosure, they will not be repeated here.

BRIEF DESCRIPTION OF THE FIGURES

Other advantages, aims, and characteristics of the present disclosure will become apparent from the following description, which is provided for the purpose of explanation and is in no way limiting, with reference to the appended drawings, in which.

DESCRIPTION OF EMBODIMENTS

Figure 1:
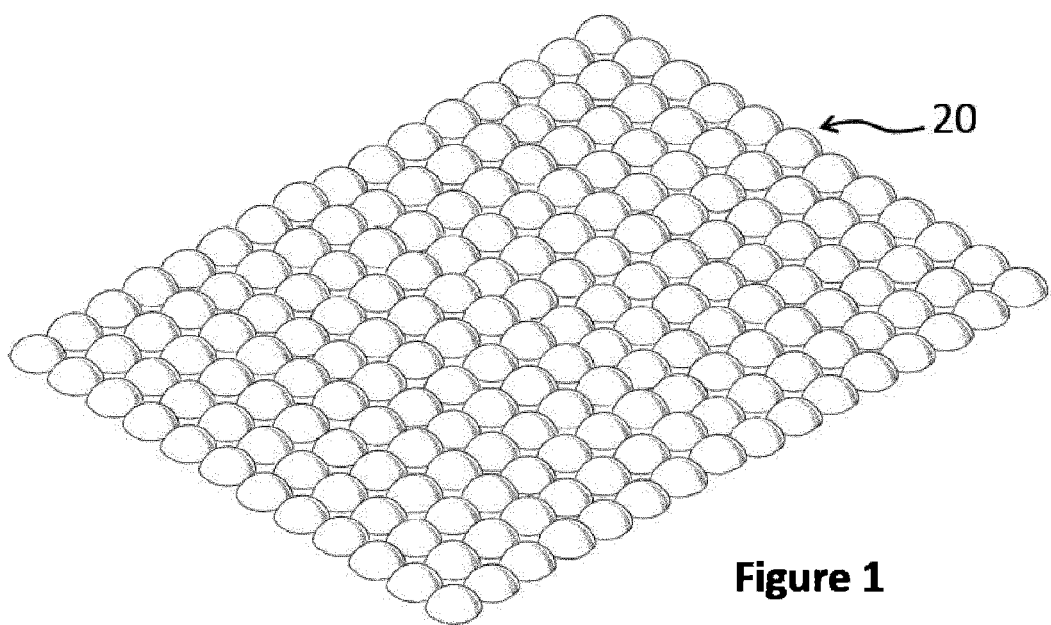
FIG. 1 shows a perspective diagram of a film of transparent material used in the present disclosure.

FIG. 1 shows a perspective diagram of a film 20 of transparent material used in the present disclosure.

The film 20 has lenses that are arranged in a plurality of parallel rows. The film 20 consists of an array of lenses. The array of lenses is composed of round-based lenses or square-based lenses.

The film 20 of transparent material or the lenticular film 20 makes it possible to create different points of view of an image or a plurality of images on several levels. In one exemplary embodiment, there are three levels.

In one exemplary embodiment, the multiple images that are visible in the lenticular film 20 comprise a wallpaper pattern. The lenticular film 20 also comprises an overlay pattern.

Figure 2:
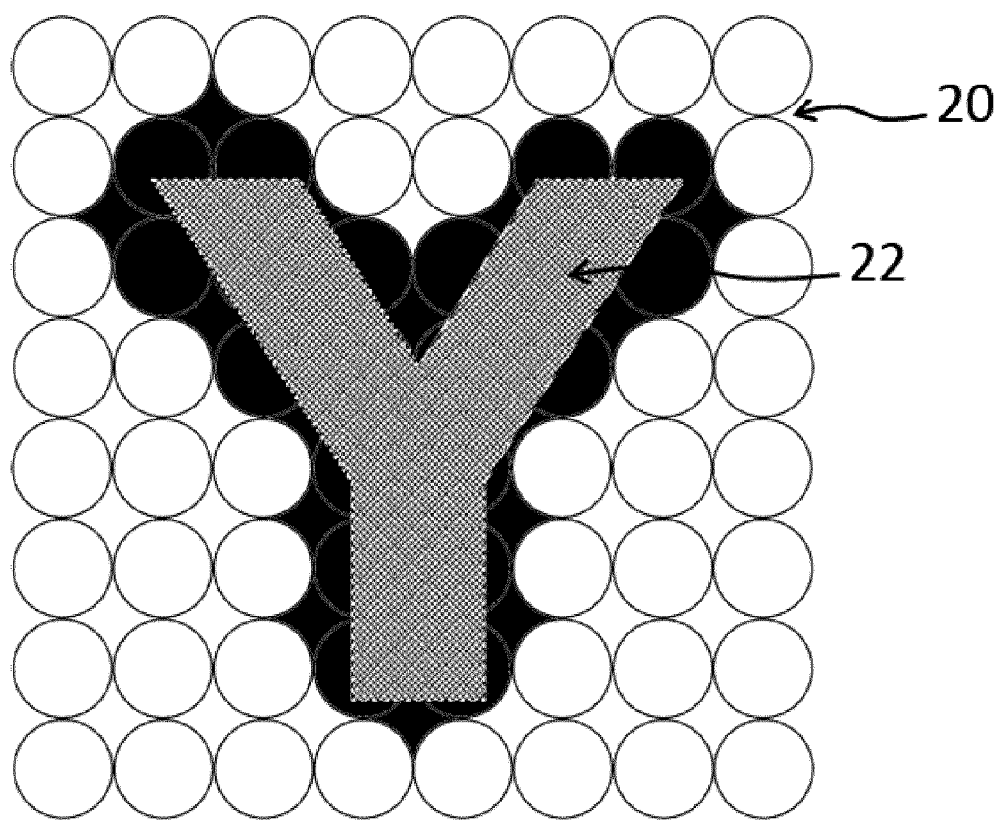
FIG. 2 shows a diagram in top view of the problem of applying the ink or the varnish to the film of the preceding figure.

FIG. 2 shows a diagram in top view of the problem of applying the ink or the varnish 22 to the film 20 of the preceding figure.

The difficulty consists in printing graphic elements having clear contours that are faithful to the models to be reproduced and have a flat and smooth surface condition.

This figure makes it possible to demonstrate the flow of the ink or the varnish 22 among the array of lenses. This gives an impression of blurred and ill-defined contours. The present disclosure seeks to solve this problem.

Figure 3:
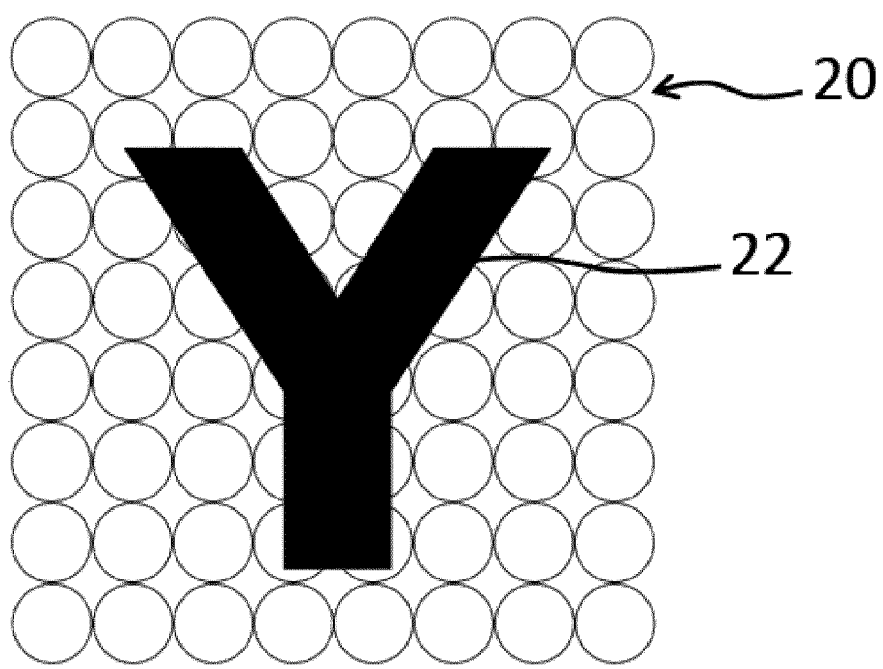
FIG. 3 shows a diagram in top view of the desired rendering during the application of the ink or the varnish to the film of transparent material according to an exemplary embodiment.
Figure 4:
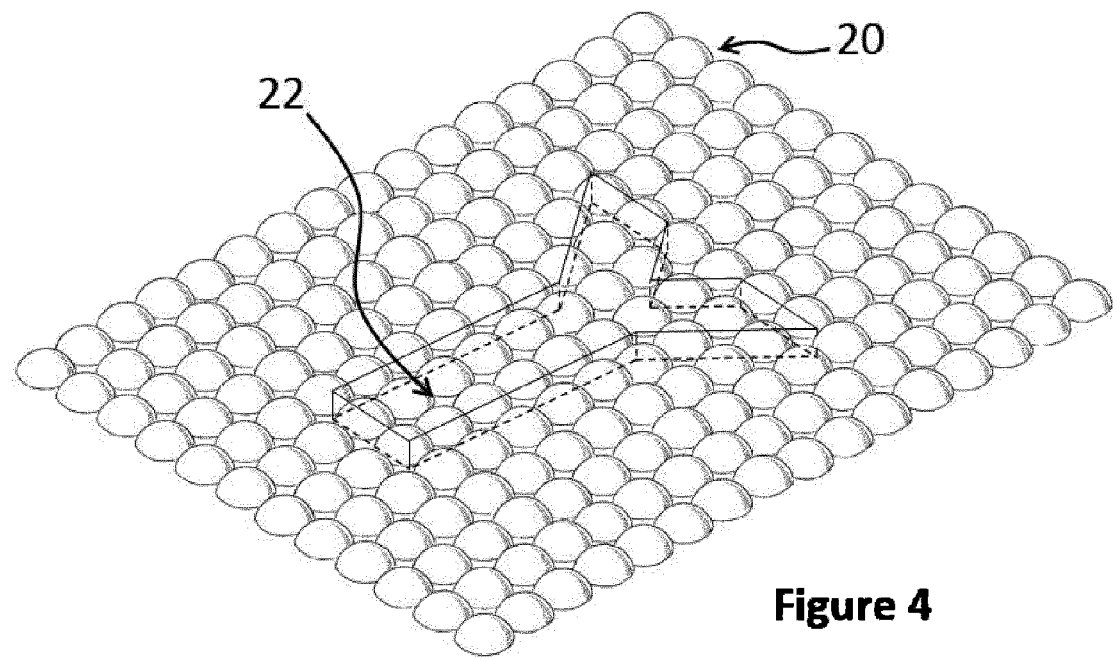
FIG. 4 shows a perspective diagram of the desired rendering during the application of the ink or the varnish to the film of transparent material according to an exemplary embodiment.

FIGS. 3 and 4 show a diagram in top and perspective view of the desired result during the application of the ink or the varnish 22 to the film 20 of transparent material. In the example, the letter Y is shown.

Figure 5:
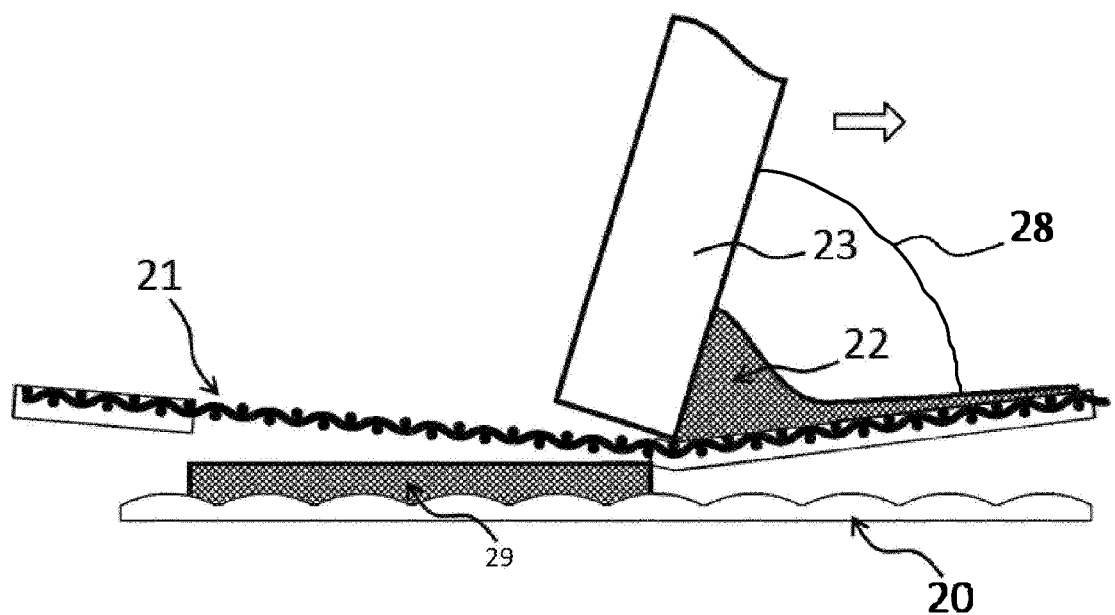
FIG. 5 shows a diagram of a step for manufacturing a visual display assembly according to the disclosure.

FIG. 5 shows a diagram of a step for manufacturing a visual display assembly according to the disclosure.

The method comprises a certain screen printing step as a means of printing on the first surface of the film 20 of transparent material.

Screen printing is used as the means of printing in order to achieve the objective of eliminating the unwanted bleeding effect.

This means makes it possible to control and qualify the various parameters mentioned below, namely depositing a thick film of ink or varnish 22 with sufficiently clear and precise contours.

This figure shows the film 20 of transparent material to which ink or varnish 22 is applied. The screen-printing fabric 21 is positioned over the film 20 in proximity thereto. Proximity is understood to mean that it is approximately 3 mm with a tolerance of plus or minus 0.5 mm. This is to allow good, clean, and precise detachment of the screen-printing fabric 21 after the passage of the ink or the varnish 22 while avoiding any risk of smudging.

The screen-printing fabric 21 comprises a portion that allows the ink or varnish 22 to pass through so that it can be deposited on the first surface of the film 20. The screen-printing fabric 21 has solid portions, called capillary film, having sharp edges around the area that allows the ink or varnish 22 to pass through.

In an exemplary embodiment, the screen-printing fabric 21 consists of a solid portion that does not allow ink or varnish 22 to pass through and at least one zone for passage of ink or varnish 22.

The solid portion or capillary film makes it possible to obtain the lowest possible roughness value in order to allow repetition of the wiping. The Rz value is 5 microns with a tolerance of up to 7 microns.

The roughness value is so low that it can be the that the surface of the solid area or of the capillary film is not rough.

The screen-printing fabric 21 comprises 90 threads/cm in order to allow a relatively substantial deposit of ink or varnish 22, with a tolerance of between 71 threads/cm and 120 threads/cm depending on the fineness of the pattern to be reproduced.

The screen-printing fabric 21 is colored in order to block diffusion phenomena and to have the best possible definition during the exposure of the artwork.

The thickness of the ink or the varnish 22 is between 40 microns and 70 microns.

For good printing quality (clear and precise contours+ smooth surface of the printed patterns), the ink or varnish 22 has the rheological properties below, according to one exemplary embodiment:

Pseudo-plastics: In order to pass through the fabric, the ink or varnish 22 must reach a viscosity of less than 500 poises under a shear of 100 s−1. At rest, the ink or the varnish 22 has a high viscosity in order to keep the particles in suspension and prevent settling phenomena. During printing, the ink or varnish 22 is subjected to shear stresses due to the passage of the squeegee. In order for the ink or varnish 22 to pass through the mesh of the fabric, the viscosity must decrease with the applied stresses.

Thixotropic: the ink or the varnish 22 has a thixotropy in order to obtain good definition after the removal of the squeegee. According to one exemplary embodiment, the ink or the varnish 22 must regain a viscosity of greater than 10,000 poises. The ink or varnish 22 must "coat/smooth" in order to remove the trace of the mesh of the fabric, but it must not "flow," so that clean and precise contours are maintained. The viscosity must therefore return slowly to its initial value in order to allow the ink or the varnish 22 time to smooth.

According to one exemplary embodiment, the ink or the varnish 22 is modified in order to adapt its rheological behavior and adapt it to the irregular surface of the lenticular film 20.

According to Examples

Agents of thixo base type, +3% by weight±1%, are added to the ink or to the varnish 22 depending on the fineness and the detail of the patterns to be reproduced.

Gelling agents are added in order to increase the initial viscosity by up to 1% (±0.2%).

Silicone-type tensioning agents are added in an amount of 2%±0.5% so as to promote the smoothing of the ink or the varnish 22 and to prevent "orange peel" phenomena after printing.

After printing, there is a step of drying the ink or varnish 22 under the ultraviolet tunnel. The time between printing and passage under the ultraviolet tunnel is increased in intervals on the order the minutes or, according to one example, two minutes, as opposed to 5 seconds on average, as is customary in the profession. The ink or varnish 22, which has become strongly thixotropic, is thus allowed time to regain its initial viscosity and for it to regain a good "smoothness" before being dried definitively.

This figure also shows a squeegee 23 that is passing (displaced) over the ink or varnish passage zone 29. In other words, squeegee 23 is movable, more specifically with respect to the screen-printing fabric (21) and/or the film (20) of transparent material. The squeegee 23 makes it possible, with a certain amount of pressure and at a certain displacement speed, to remove the excess ink or varnish 22.

The printing speed is 8 meters/minute (with a tolerance of plus or minus 1 m/minute) that is adapted to the rheology of the very viscous ink or varnish 22.

The squeegee 23 has a Shore hardness of 75±5. More specifically, the squeegee 23 has a Shore A hardness of between about 70 to about 80, more specifically between about 72 to about 78, and in particular about 75. The determination of the Shore hardness, more specifically of the Shore A hardness, is not particularly limited and may be performed with a durometer e.g. according to ISO 868. The squeegee 23 profile is rectangular. The inclination of the squeegee is 75° (±5°) relative to the screen-printing fabric 21.

According to one example, the squeegee is sharpened every 2 hours and changed according to its state of wear in order to maintain high precision during printing.

The vertical pressure that is applied to the squeegee must be controlled with care and be adjusted to the non-printing limit, meaning that removing the pressure does not allow the ink or varnish 22 to pass through the screen-printing fabric 21.

The pressure adjustment makes it possible to bring the lower surface of the screen-printing fabric 21 into contact with the top of the lenses of the film 20 without causing any deformation of the printing squeegee.

Too much pressure causes more ink or varnish 22 to pass through the fabric than necessary and promotes the flow and uncontrolled bleeding of the ink or varnish 22 on the lenticular support.

Figure 6:
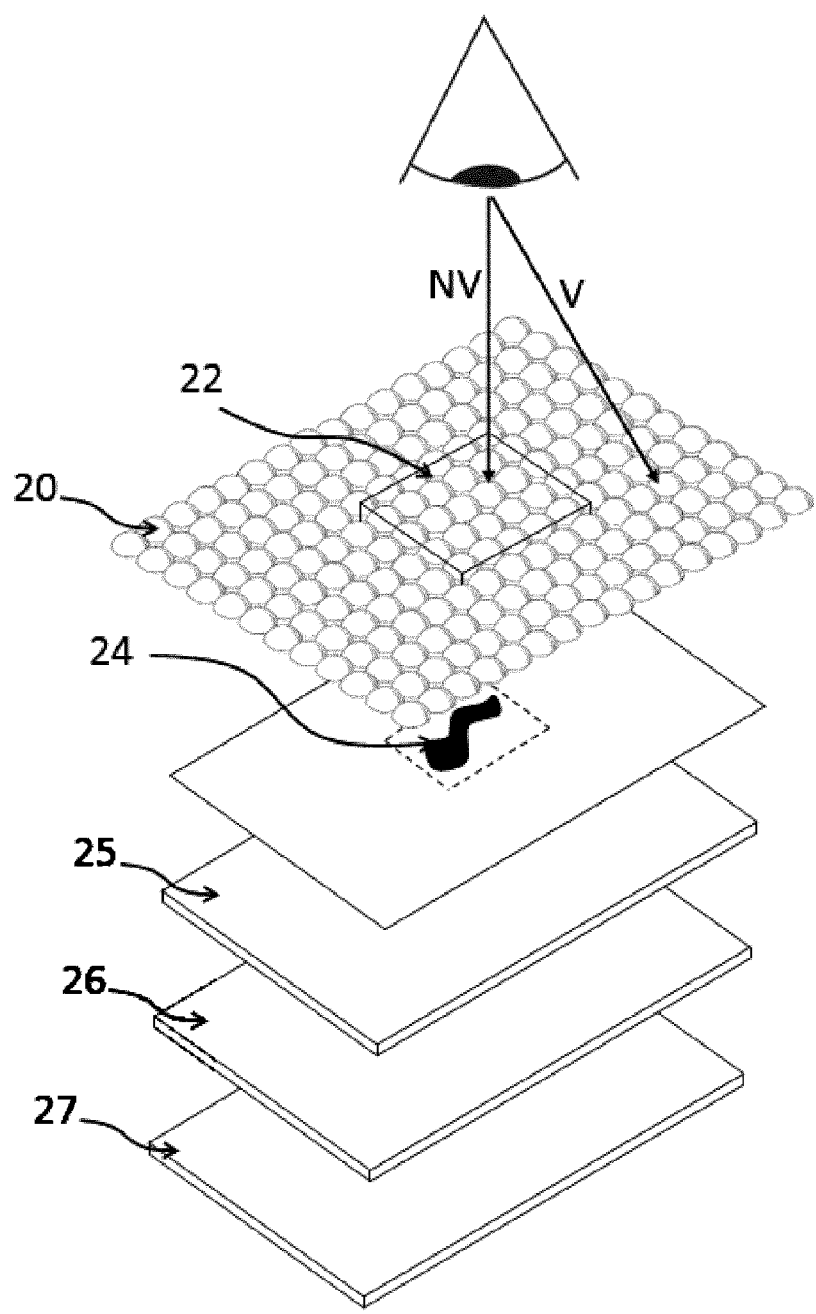
FIG. 6 shows an exploded perspective diagram of the visual display assembly according to an exemplary embodiment.

FIG. 6 shows an exploded perspective diagram of the visual display assembly according to an exemplary embodiment.

The assembly is composed of the following different layers:
- a film 20 of transparent material comprising a first surface and a second surface opposite the first surface, the first surface comprising an array of lenses comprising information that is arranged such that it is capable of providing multiple images when the images are viewed from different predetermined angles through the lenses;
- an image or a pattern that is printed with ink or varnish 22 and partially covers the first surface;
- a print 24 with a printing ink representing an image or a pattern;
- a flexible printable support 25;
- a layer of adhesive 26;
- silicone support 27.

In this figure, the arrow NV shows a layer of varnish that masks the 3D effect. The arrow V shows the 3D effect.

This involves depositing a transparent varnish or ink on the flexible 3D lenticular film. This has the effect of completely neutralizing the 3D effect obtained with the flexible 3D lenticular film.

In the example shown, the varnish is selectively deposited with the desired design at the desired location. The varnish thus makes it possible to mask the 3D effect, which can pose a detriment to the correct reading of a graphic element such as fine text or a logo, for example.

Adding varnish to an element of the decoration makes it possible to visually isolate it, detaching it from the decoration by placing it in the foreground, which adds an additional plane to the initial 3D motif.

It is attractive from a marketing perspective to highlight the logo of a brand, for example.

The advantage of the 3D layer is that these provisions further increase the difficulty in counterfeiting the product and, consequently, enhance its anti-counterfeiting aspect.

Figure 7:
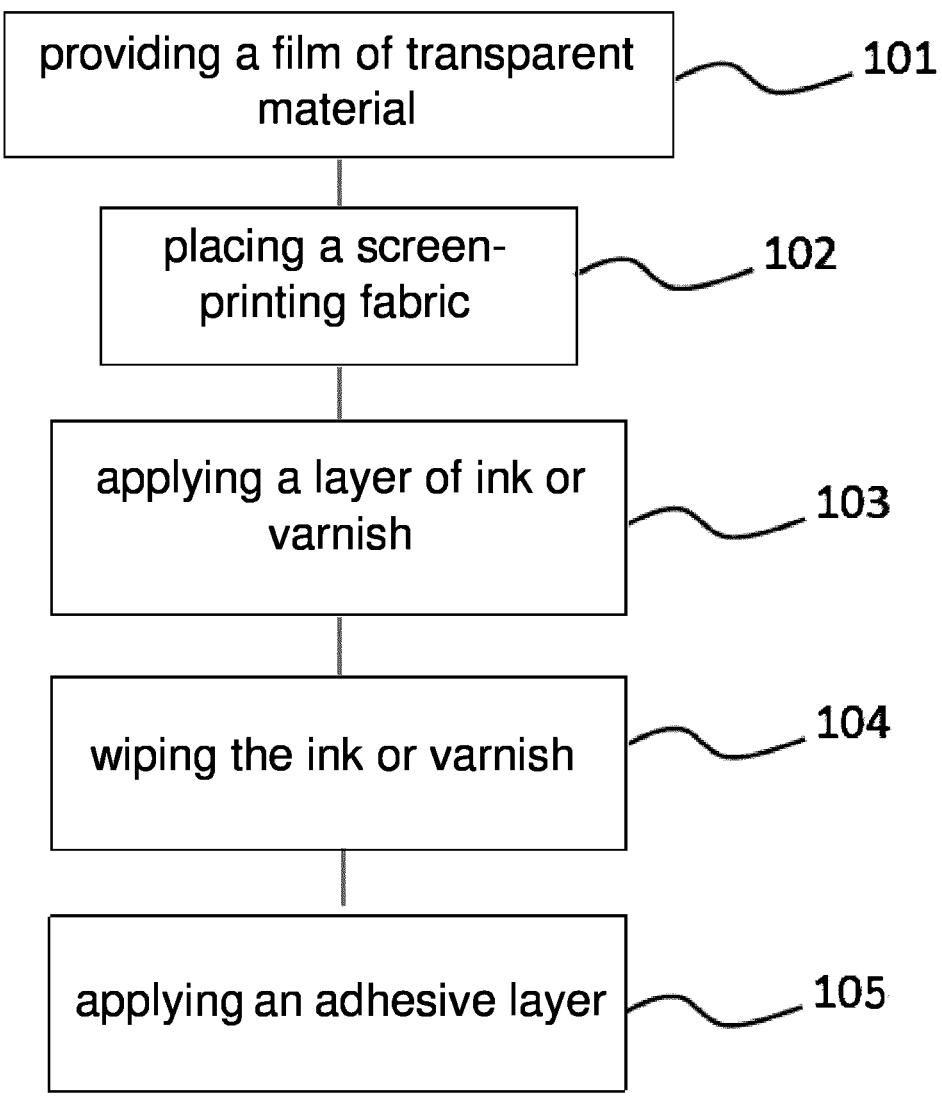
FIG. 7 shows, in the form of a flowchart, the steps implemented in a particular embodiment of the method for manufacturing a visual display assembly according to the disclosure.

FIG. 7 shows, in the form of a flowchart, the steps implemented in a particular embodiment of the method for manufacturing a visual display assembly according to the disclosure.

The method comprises the following steps:
- a step 101 of supplying a film 20 of transparent material comprising a first surface that comprises an array of lenses;
- a step 102 of placing a screen-printing fabric 21 in proximity to the first surface of the film 20;
- a step 103 of applying a layer of ink or varnish 22 through the screen-printing fabric 21 so that a portion of the ink or varnish 22 is applied to the first surface of the film 20 of transparent material;
- a step 104 of wiping the ink or varnish 22 by means of a squeegee 23.

During step 104, the squeegee 23 is rectangular in shape and is inclined relative to the normal plane of the screen-printing fabric at an angle 28 of between 70° and 80° During step 105, an adhesive layer may be applied to the second surface of the transparent material.

More specifically a movable squeegee 23 is particularly suitable for being used on a curved, elliptical and/or essentially cylindrical surface.

LIST OF REFERENCE SYMBOLS

TABLE 1

| References | Designations |
|---|---|
| 20 | Film of transparent material |
| 21 | Screen-printing fabric |
| 22 | Ink or varnish |
| 23 | Squeegee |
| 24 | Printing-ink print |
| 25 | Flexible printable support |
| 26 | Adhesive |
| 27 | Silicone support |

The invention claimed is:

1. A method for manufacturing a visual display assembly, characterized in that the method comprises:
   providing a film of transparent material comprising a first surface and a second surface opposite the first surface, wherein only the film of transparent material is between the first surface and the second surface and wherein the film of transparent material is a single substrate, the first surface comprising an array of lenses arranged so as to be capable of providing multiple images when the multiple images are viewed from different predetermined angles through the lenses;
   placing a screen-printing fabric in direct contact with the first surface, the screen-printing fabric comprising a deposit portion and a capillary film portion, wherein the screen-printing fabric including between 71 and 120 threads per cm, and wherein the screen-printing fabric is colored to block diffusion phenomena;
   applying a layer of ink or varnish including at least a gelling agent and a silicone-type tensioning agent to the screen-printing fabric, wherein the deposit portion allows passage of the ink or varnish for placement on a portion of the first surface in order to form a pattern or a printed image on the first surface and the capillary film portion prevents ink or varnish from passing through the screen-printing fabric, wherein the layer of ink or varnish includes a thickness that extends outward from the first surface and away from the second surface, and wherein the second surface is flat and free of ink, varnish, and images; and
   wiping the ink or varnish by means of a squeegee over the screen-printing fabric so that the pattern or the printed image includes a generally planar top ink surface that is substantially parallel to the second surface.

2. The method according to claim 1, wherein the squeegee is movable and a viscosity of the ink or varnish decreases as the squeegee moves the ink or varnish.

3. The method according to claim 2, wherein the squeegee is movable with respect to the screen-printing fabric and/or the film of transparent material such that the ink or varnish displays a viscosity of less than 500 poises under a shear of 100 s-1 while the ink or varnish is moved with the squeegee.

4. The method according to claim 1, wherein the squeegee is displaced over an ink or varnish passage zone.

5. The method according to claim 1, wherein the squeegee has a rectangular profile.

6. The method according to claim 1, wherein the squeegee has a Shore hardness between 70 and 80.

7. The method according to claim 1, wherein the squeegee is inclined relative to a normal plane of the screen-printing fabric at an angle of between 70° and 80°.

8. The method of claim 7, wherein the squeegee is movable with respect to the screen-printing fabric and/or the film of transparent material such that the ink or varnish displays a viscosity of less than 500 poises under a shear of 100 s-1 while the ink or varnish is moved with the squeegee, wherein the squeegee is displaced over an ink or varnish passage zone, and wherein the ink or varnish is thixotropic.

9. The method according to claim 1, wherein the method further comprises a step of applying an adhesive layer to the second surface of the transparent material.

10. The method according to claim 1, wherein the method further comprises:
    providing a flexible support on which a pattern, image, or text is printed, the flexible support being positioned beneath the second surface of the film of transparent material;
    applying an adhesive layer beneath the flexible support, the adhesive layer being configured such that the flexible support and the adhesive layer can be peeled off together and then re-glued at least once without leaving a trace of the adhesive layer; and
    applying a silicone support beneath the adhesive layer.

11. The method according to claim 1, wherein the screen-printing fabric comprises between 71 to 90 threads/cm.

12. The method according to claim 1, wherein the thickness of the layer of ink or varnish is between 40 microns and 70 microns.

13. The method for manufacturing a visual display assembly of claim 1, wherein the first surface comprises an array of round-based or square-based lenses.

14. The method of claim 13, wherein the array of lenses is round-based.

15. The method of claim 13, wherein the array of lenses is square-based.

16. The method of claim 1, wherein the ink or varnish is thixotropic.

17. The method of claim 1, further comprising, after a period of time, drying the ink or varnish under an ultraviolet tunnel, wherein the ink or varnish an initial viscosity during the period of time, and wherein the period of time is two minutes.

18. The method of claim 17, wherein diffusion phenomena is the bleeding of the ink or varnish after the ink or varnish is applied to the screen-printing fabric.

19. The method of claim 18, wherein the deposit portion of the screen-printing fabric includes sharp edges that allow for the ink or varnish to pass through.

20. The method of claim 19, wherein the ink or varnish further includes a thixo base type.

21. A visual display assembly comprising:
a film of transparent material comprising a first surface and a second surface opposite the first surface, wherein only the film of transparent material is between the first surface and the second surface and wherein the film of transparent material is continuous, the first surface comprising an array of round-based or square-based lenses arranged so as to be capable of providing multiple images when the multiple images are viewed from different predetermined angles through the array of round-based or square-based lenses; and
a screen-printed image or a pattern that covers a portion of the first surface, wherein the screen-printed image or the pattern is printed with a layer of ink or varnish by pressing the ink or varnish through a screen-printing fabric, the ink or varnish including at least a gelling agent and a silicone-type tensioning agent, wherein the screen-printed image or the pattern includes a top ink surface that is generally planar and substantially parallel to the second surface of the film of transparent material, wherein the screen-printing fabric is colored to block diffusion phenomena, and wherein the second surface is flat and free of ink, varnish, and images.

\* \* \* \* \*